(12) United States Patent
Shpilyuck et al.

(10) Patent No.: US 11,455,220 B2
(45) Date of Patent: Sep. 27, 2022

(54) CLOUD TO CLOUD DISASTER RECOVERY

(71) Applicant: EMC IP Holding Company LLC, Hopkinton, MA (US)

(72) Inventors: Boris Shpilyuck, Ashdod (IL); David Zlotnick, Tel Aviv (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 16/405,465

(22) Filed: May 7, 2019

(65) Prior Publication Data
US 2020/0356452 A1  Nov. 12, 2020

(51) Int. Cl.
*G06F 11/20* (2006.01)
*G06F 11/14* (2006.01)
*G06F 9/455* (2018.01)

(52) U.S. Cl.
CPC ........ *G06F 11/203* (2013.01); *G06F 9/45558* (2013.01); *G06F 11/1451* (2013.01); *G06F 11/1464* (2013.01); *G06F 11/1469* (2013.01); *G06F 2009/4557* (2013.01); *G06F 2009/45562* (2013.01); *G06F 2009/45575* (2013.01); *G06F 2201/815* (2013.01); *G06F 2201/84* (2013.01)

(58) Field of Classification Search
CPC .............. G06F 11/203; G06F 11/1451; G06F 11/1464; G06F 11/1469; G06F 9/45558; G06F 2009/45562; G06F 2201/815; G06F 2201/84; G06F 11/1484; G06F 2009/4557; G06F 2009/45575; G06F 9/505; G06F 9/5088; H04L 41/0897
See application file for complete search history.

(56) References Cited

U.S. PATENT DOCUMENTS

| | | | |
|---|---|---|---|
| 2018/0129523 A1* | 5/2018 | Bryant | G06F 1/3203 |
| 2019/0235901 A1* | 8/2019 | Aiyar | G06F 9/5083 |
| 2019/0278662 A1* | 9/2019 | Nagrale | G06F 11/1451 |
| 2019/0286467 A1* | 9/2019 | Singh | G06F 9/45558 |
| 2020/0007620 A1* | 1/2020 | Das | H04L 41/22 |
| 2020/0117494 A1* | 4/2020 | Cortez | G06F 9/5088 |

OTHER PUBLICATIONS

Barr, Jeff et al., Building Fault-Tolerant Applications on AWS, Oct. 2011, Amazon Web Services, Retrieved from Google, https://d36cz9buwru1tt.cloudfront.net/AWS_Building_Fault_Tolerant_Applications.pdf (Year: 2011).*
Reed, Jessie, How to Perform AWS EC2 Backup: Step-By-Step Guide, Apr. 22, 2019, Nakivo, Retrieved from Google, https://www.nakivo.com/blog/perform-aws-ec2-backup-step-step-guide/ (Year: 2019).*

(Continued)

*Primary Examiner* — Bryce P Bonzo
*Assistant Examiner* — Albert Li
(74) *Attorney, Agent, or Firm* — Krishnendu Gupta; Deepika Bhayana; Derek Lam (57) ABSTRACT

Methods, systems, and computer program products for cloud to cloud disaster recovery are disclosed. Exemplary embodiments may: discover one or more virtual machines associated with a first auto scaling group; and generate a plan to backup the one or more virtual machines to a second cloud.

15 Claims, 6 Drawing Sheets

(56) References Cited

OTHER PUBLICATIONS

Elisha, Simon et al., Migrating AWS Resources to a New Region, Nov. 2012, Amazon Web Services, Retrieved from Google, https://d0.awsstatic.com/whitepapers/AWS_Migrate_Resources_To_New_Region.pdf (Year: 2012).*

"Basic Scenario in Auto Scaling", Nov. 1, 2012, AWS Documentation, Retrieved from The Wayback Machine: <https://web.archive.org/web/20121101165037/http://docs.amazonwebservices.com/AutoScaling/latest/DeveloperGuide/US_BasicSetup.html> (Year: 2012).*

Serman, Logan, ELBAS (Elastic Load Balancers & AutoScaling), Jul. 12, 2014, GitHub, Retrieved from the Internet: <https://github.com/Iserman/capistrano-elbas/blob/c750a428983176c28f6008dd7ddccfb6d9fd990a/README.md> (Year: 2014).*

Bartos, Paul, Create an AMI from an Amazon EC2 Instance, Mar. 23, 2019, GitHub, Retrieved from the Internet: <https://github.com/awsdocs/aws-toolkit-visual-studio-user-guide/blob/6dc903f5667ee05af2b9640f1dff4607bc5284eb/doc_source/tkv-create-ami-from-instance.md> (Year: 2019).*

* cited by examiner

CLOUD TO CLOUD DISASTER RECOVERY

FIELD OF THE DISCLOSURE

The present disclosure relates to disaster recovery.

DESCRIPTION OF RELATED ART

Entities often generate and use large amounts of data and compute resources that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments. Entities often run their compute workloads in a cloud environment and massively use auto scaling groups. Auto scaling groups can be used to more easily manage large numbers of compute resources, for example virtual machines (VMs), in a cloud environment.

Thus, disaster recovery (DR), that is, recovery and restoration of backed up data after a problem or loss has occurred, is an important process for organizations. One approach to disaster recovery is to create a temporary restore virtual machine (VM) in a cloud storage environment. Note that the terms "restore virtual machine" and "virtual machine" can be used interchangeably. When called upon, the VM executes a disaster recovery process. This approach, however, has proved problematic for various reasons.

For example, for multiple VMs in an auto scaling group, the disaster recovery process may take a long time to perform may consume a large amount of network traffic related to recovering the multiple VMs in the auto scaling group, and may consume a large amount of storage and other resources on the recovery cloud. As well, the cost for the disaster recovery process would be accordingly high, because cloud usage is typically paid on an hourly basis, cloud storage usage is paid for based on the amount of storage used, and also costs are increased based on the large amount of network traffic used to recover multiple VMs.

SUMMARY OF THE INVENTION

Embodiments of this disclosure relate to a method, system, and computer program product for cloud to cloud disaster recovery may include discovering one or more virtual machines associated with a first auto scaling group, the one or more virtual machines may be running on a first cloud, the first auto scaling group may have settings related to running the one or more virtual machines. Some embodiments may include generating a plan to backup the one or more virtual machines to a second cloud, the plan may include choosing a proper subset of the one or more virtual machines to backup, the plan may include creating one or more restore virtual machine images based on the proper subset of the one or more virtual machines to backup, and the plan may include initializing a second auto scaling group on the second cloud based on the settings and the one or more restore virtual machine images.

In some embodiments, the proper subset of the one or more virtual machines to backup may be a single virtual machine. In some embodiments, the one or more restore virtual machine images may be a single restore virtual machine image. In some embodiments, the plan may further include launching, by the second auto scaling group, a set of virtual machines on the second cloud based on the settings and the one or more restore virtual machine images. In some embodiments, the creating the one or more restore virtual machine images may be performed by a restore virtual machine on the second cloud.

Some embodiments may include executing the plan. In some embodiments, executing the plan may include backing up the proper subset of the one or more virtual machines to the second cloud.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a' 'an,' and 'the' include plural referents unless the context clearly dictates otherwise.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below is a technique for use in, for example, cloud to cloud disaster recovery, which technique may be used to provide, among other things, discovering one or more virtual machines associated with a first auto scaling group, wherein the one or more virtual machines are running on a first cloud, wherein the first auto scaling group has settings related to running the one or more virtual machines, and generating a plan to backup the one or more virtual machines to a second cloud, wherein the plan comprises choosing a proper subset of the one or more virtual machines to backup, wherein the plan comprises creating one or more restore virtual machine images based on the proper subset of the one or more virtual machines to backup, wherein the plan comprises initializing a second auto scaling group on the second cloud based on the settings and the one or more restore virtual machine images.

The typical approach to performing disaster recovery in a cloud environment is to create a corresponding restore VM that performs the actual disaster recovery activity for each VM to be restored (also known as a target protected VM), even within the same auto scaling group. In other words, for each VM to be restored, even within the same auto scaling group, a separate restore VM will be created, along with corresponding resources. For example, for each VM to be restored, create virtual machine disks of the same sizes as in a target protected VM, read the segmented backup copies data from cloud storage, and fill the virtual machine disks with the relevant segmented data. After the virtual machine disks are created and filled with relevant data, for each VM to be restored, a restore VM image will be created based on the corresponding disks. Note that the terms "restore virtual machine image" and "virtual machine image" can be used interchangeably. Then a new VM will be launched from each VM image above and the disaster recovery process will be completed.

Generally, such an approach is inefficient (which also includes cost inefficiencies) in some scenarios, for example, cloud to cloud DR. In some scenarios, VMs to be protected are members of the same auto scaling group in the source cloud. Sources of inefficiencies include, copying data from a source cloud to a target cloud for each VM in an auto scaling group, creating virtual machine disks for each VM in an auto scaling group, creating virtual machine images for each VM in an auto scaling group, creating a restore VM for each VM in an auto scaling group, manually identifying VMs belonging to an auto scaling group on the target cloud—in some cases, such VMs can number in the hundreds or thousands, manually creating an auto scaling group on the target cloud and defining settings for the auto scaling group, including scale in/out policies. Scale in/out policies can be used in managing VMs in an auto-scaling group. For example, scale in/out policies can be used to specify: a minimum and maximum number of VMs in an auto scaling group; a maximum amount of CPU usage threshold by the VMs in the auto scaling group that should trigger launching one or more new VMs by the auto scaling group; a maximum amount of memory to be used by each VM; an average amount of disk read bytes per unit of time threshold that should trigger launching one or more new VMs by the auto scaling group; an average amount of disk write bytes per unit of time threshold that should trigger launching one or more new VMs by the auto scaling group; a health check period (i.e. how often to check the policies); specify an adjustment type (e.g., a percentage VM increase/decrease or exact VM capacity change—for example, when needing to increase the size of the auto scaling group (i.e. number of VMs associated with the auto scaling group), whether to increase the number of VMs by, say, 3% or by 2 VMs); and the like.

By contrast, in at least some embodiments in accordance with the techniques described below, a method and system are provided for improved cloud to cloud disaster recovery. Thus, in at least one embodiment of the current technique, cloud to cloud disaster recovery can be improved by the system enabling discovering one or more virtual machines associated with a first auto scaling group, wherein the one or more virtual machines are running on a first cloud, wherein the first auto scaling group has settings related to running the one or more virtual machines, and generating a plan to backup the one or more virtual machines to a second cloud, wherein the plan comprises choosing a proper subset of the one or more virtual machines to backup, wherein the plan comprises creating one or more restore virtual machine images based on the proper subset of the one or more virtual machines to backup, and wherein the plan comprises initializing a second auto scaling group on the second cloud based on the settings and the one or more restore virtual machine images.

In at least some embodiments in accordance with the techniques as described herein, the use of the way to improve cloud to cloud disaster recovery can provide one or more of the following advantages: faster recovery time, decreased cost associated with disaster recovery by, for example, use of less cloud storage resources, or use of less cloud storage compute time.

Figure 1:
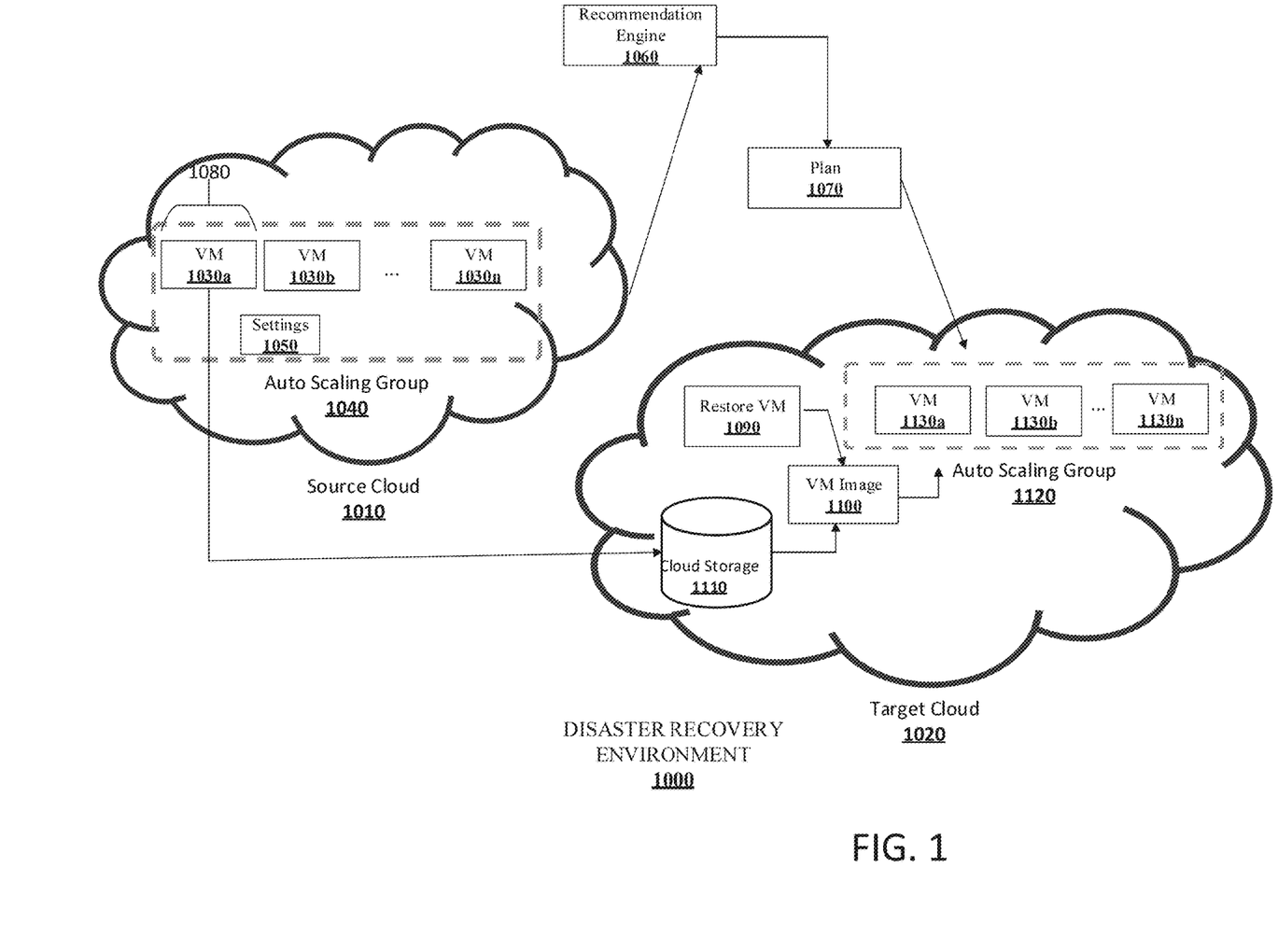
FIG. 1 is a simplified block diagram of an example system configured in accordance with an embodiment of the present disclosure.

FIG. 1 depicts an example embodiment of a system that may be used in connection with performing the techniques described herein. In some embodiments, system 1000 may be a disaster recovery environment including one or more clouds, for example a source cloud 1010 and a target cloud 1020. Running on the source cloud 1010 may be one or more virtual machines (VMs) 1030a, 1030b, . . . 1030n. In some embodiments, the one or more VMs 1030a-n may be associated with an auto scaling group 1040 on the source cloud 1010. In some embodiments, the auto scaling group 1040 has settings 1050 associated with running the one or more VMs 1030a-n. The settings 1050 may include scale in/out policies, which may include: minimum group size (i.e. the minimum number of VMs to run), maximum group size (i.e. the maximum number of VMs to run), maximum CPU usage, average CPU usage, and the like. In some embodiments, the auto scaling group may use the scale in/out policies, e.g., the CPU metrics (e.g., maximum CPU usage, average CPU usage) to determine how many VMs to create or destroy in the auto scaling group. For example, the settings 1050 may indicate that when CPU usage goes above 80%, create another VM to add to the auto scaling group. In some embodiments, the settings 1050 may also include parameters to use when creating a VM. In some embodiments, there are three types of parameters used when creating a VM: a location (e.g., USWest2 Region), a hardware specification for running the VM (e.g., CPU, RAM amount, number of VM disks), and the contents of the VM, which will be stored on one or more of the virtual machine disks associated with the VM.

In some embodiments, there may be an event may trigger the recovery of the VMs 1030a-n because of, for example, a disaster that impacted one or more of the VMs 1030a-n and/or the source cloud 1010. In some embodiments, a discovery process may be used to discover the auto scaling group 1040. In some embodiments, a discovery process may be used to discover the VMs 1030a-n associated with the auto scaling group 1040. In some embodiments, a discovery process may be used to discover the settings 1050 associated with the auto scaling group 1040. In some embodiments, the discovery process is initiated by a recommendation engine 1060 in communication with the source cloud 1010. In some embodiments, the recommendation engine 1060 uses an API supplied by the vendor of the source cloud 1010 to perform the discovery process.

In some embodiments, a plan 1070 is generated to backup the VMs 1030a-n to the target cloud 1020. In some embodiments, the recommendation engine 1060 generates the plan 1070. In some embodiments, the plan 1070 includes machine-readable instructions or data structures or text or some combination, which can be used to execute the plan 1070. The plan's 1070 machine-readable instructions or data structures or text or some combination are sometimes known as commands. In some embodiments, the plan 1070 includes choosing a proper subset 1080 (i.e. less than all) of the VMs 1030a-n to backup. In some embodiments, the proper subset 1080 is a single VM 1030a. In some embodiments, the proper subset 1080, e.g., VM 1030a, is logically equivalent to the VMs 1030a-n associated with the auto scaling group 1040 because the VMs 1030a-n are part of the same auto scaling group 1040 and thus have been launched with the same parameters (e.g., RAM, number of VM disks). In this way, a single VM 1030a can be chosen to be backed up rather than backing up all of the VMs 1030a-n.

In some embodiments, the plan 1070 includes creating one or more restore VMs 1090 (sometimes known as one or more restore services) on the target cloud 1020 to complete the recovery process. In some embodiments, the one or more restore VMs 1090 is a single restore VM 1090. In some embodiments, the plan includes creating one or more VM images 1100 based on the proper subset of VMs 1080. In some embodiments, the plan includes creating one or more VM images 1100 based on the contents of the VM disks of the proper subset of VMs 1080. In some embodiments, the one or more VM images 1100 is a single VM image 1100. For example, in some embodiments, when the proper subset of VMs 1080 is a single VM 1030a, a single restore VM 1090 and a single VM image 1100 will be created. In some embodiments, the creating the one or more VM images 1100 is performed by the one or more restore VMs 1090. In some embodiments, the contents of the VM disks of the proper subset of VMs 1080 is copied from the source cloud 1010 to cloud storage 110 associated with target cloud 1020. In some embodiments, cloud storage 1110 is located in the target cloud 1020. In some embodiments, copying the contents of the VM disks of the proper subset of VMs 1080 from the source cloud 1010 to the cloud storage 1100 includes copying the contents by chunk (e.g., in 4 MB chunks) along with meta data associated with each chunk, for example the location where the chunk should be written.

In some embodiments, the plan 1070 includes initializing an auto scaling group 1120 on the target cloud 1020 based on the settings 1050 and the one or more VM images 1110. In some embodiments, auto scaling group 1120 launches a set of VMs 1130a-n on target cloud 1020 based on the settings 1050 and the one or more VM images 1100, which in some embodiments may be a single VM image 1100. In some embodiments, the auto scaling group 1120 launches a single VM 1130a. In some embodiments in which a single VM 1130a is launched by the auto scaling group 1120, the auto scaling group 1120 may later launch additional VMs 1130b . . . 1130n based on the settings 1050. In this way, rather than launching a VM on the target cloud 1020 for each VM 1030a-n associated with the auto scaling group 1040 on the source cloud 1010, a single VM can initially be launched on the target cloud 1020 and more VMs can be launched later based on the settings 1050 and the operation of resource usage of the single VM, in order that resources and costs associated with running VMs on the target cloud 1020 be lowered.

In some embodiments, the plan 1070 is executed. In some embodiments, executing the plan 1070 includes backing up the proper subset 1080 of the one or more VMs 1030a-n to the target cloud 1020 in accordance with the techniques shown above. In other words, executing the plan 1070 may include the performance of the techniques described above as being included in the plan 1070. In some embodiments, the plan 1070 is presented to a user or application before execution of the plan 1070. In some embodiments, the user or application may decide to allow the plan 1070 to be executed without changes. In some embodiments, the user or application may decide to modify the plan 1070 and then allow the modified plan 1070 to be executed. By way of non-limiting example, the user or application can change the settings 1050 in the plan 1070—e.g., changing the maximum number of VMs in the auto scaling group 1120—if there is an expectation that the compute load in the target cloud 1020 will be different that the compute load in the source cloud 1010. Other settings 1050 in the plan 1070 can be changed in response to other factors in the target cloud 1020.

Figure 2:
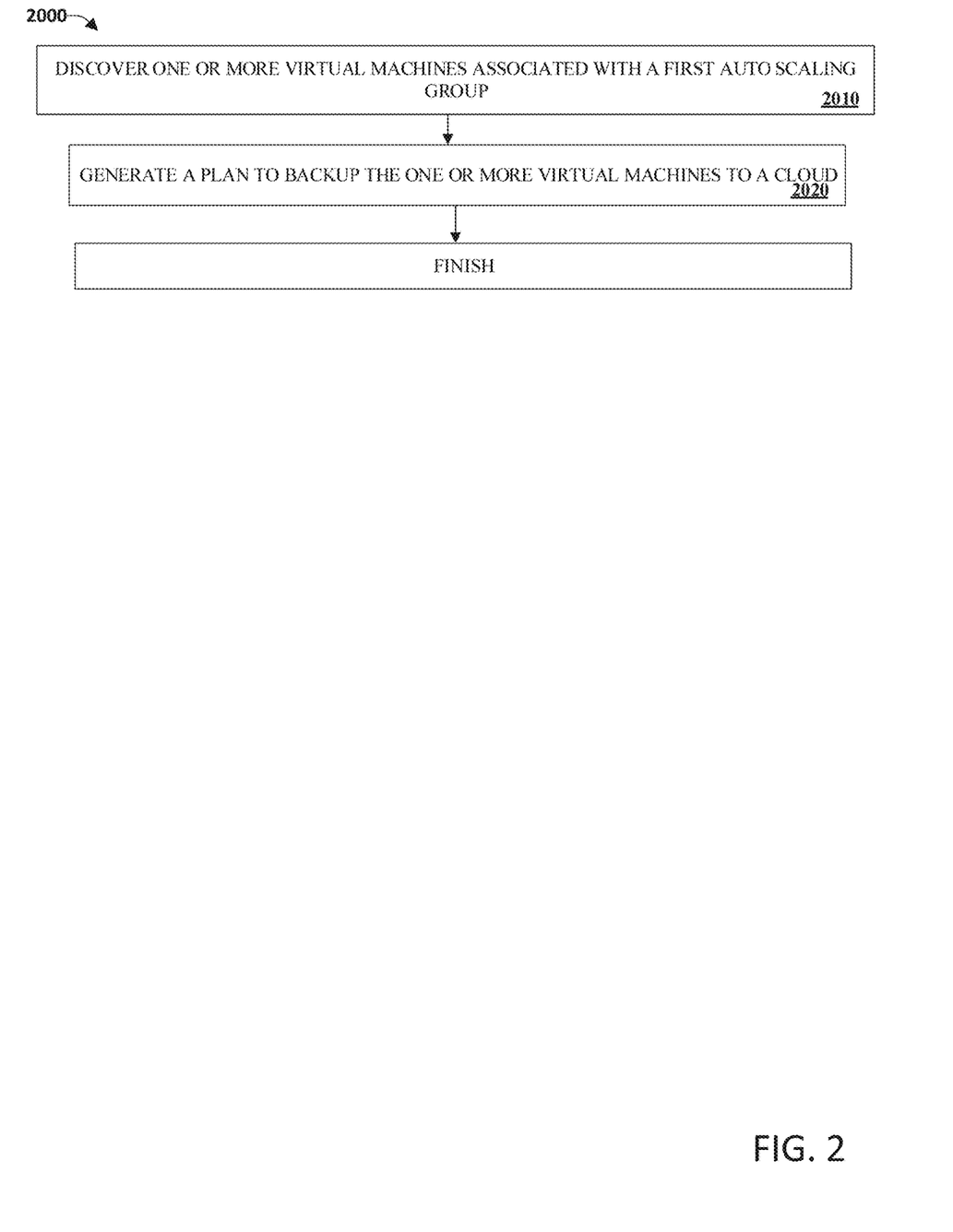
FIG. 2 is a simplified illustration of an example flow diagram, in accordance with an embodiment of the present disclosure.
Figure 3:
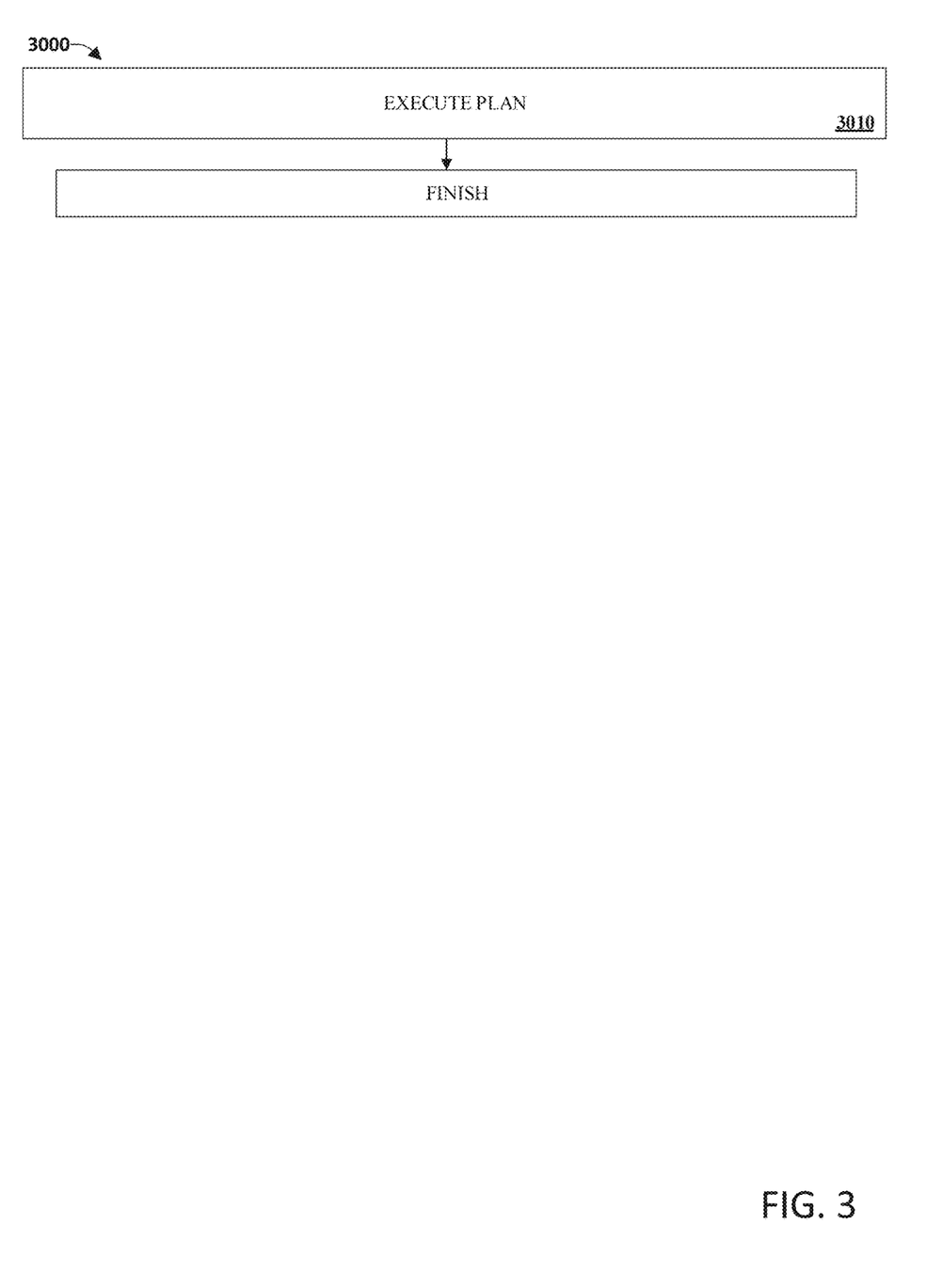
FIG. 3 is a simplified illustration of a further example flow diagram, in accordance with an embodiment of the present disclosure.
Figure 4:
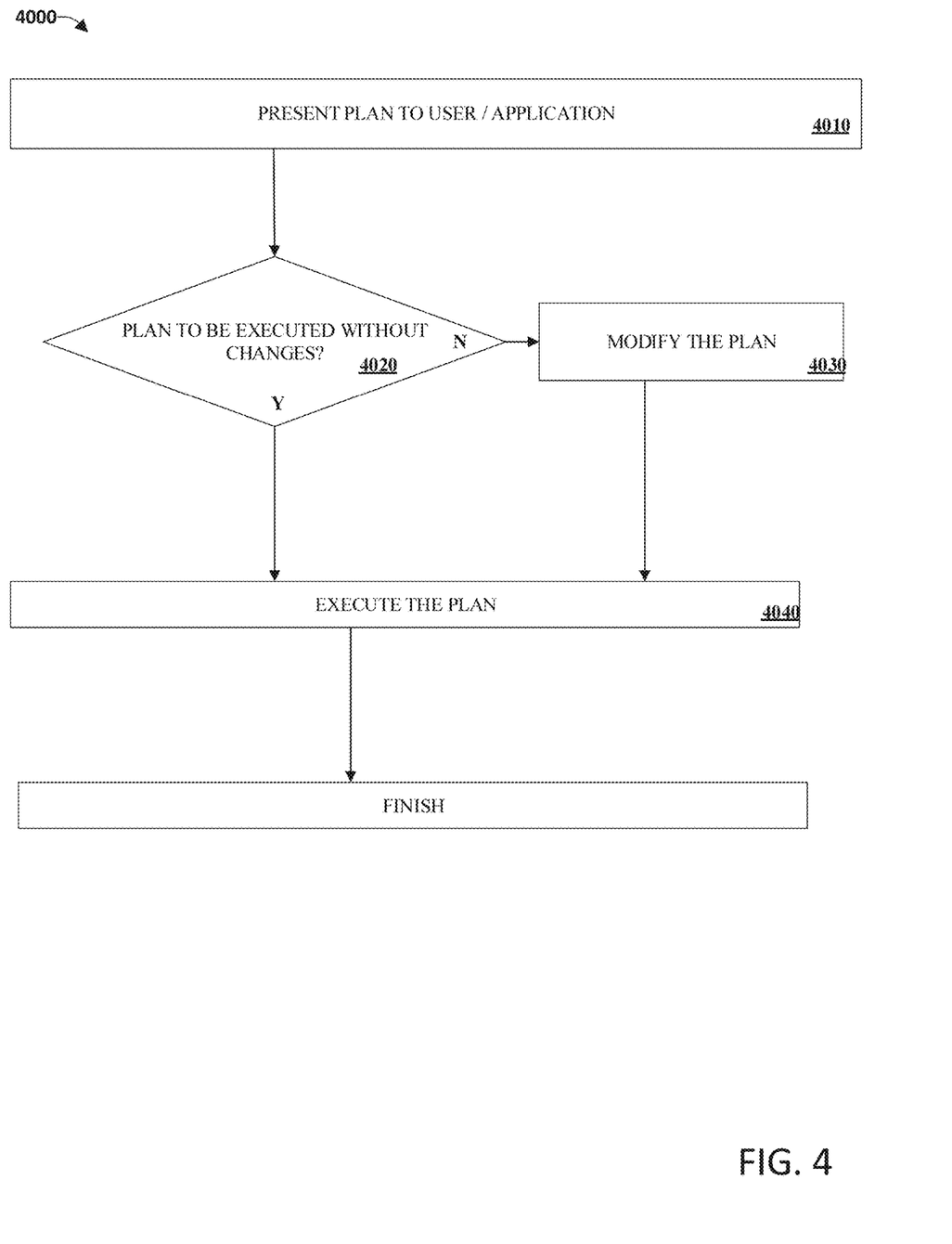
FIG. 4 is a simplified illustration of a further example flow diagram, in accordance with an embodiment of the present disclosure.

FIGS. 2-4 illustrates flow diagrams 2000, 3000, 4000 illustrating example embodiments of a method that may be used in connection with performing the techniques described herein, for example for cloud to cloud disaster recovery, in accordance with one or more embodiments. The operations of methods 2000, 3000, 4000 presented below are intended to be illustrative. In some embodiments, methods 2000, 3000, 4000 may be accomplished with one or more additional operations not described, and/or without one or more of the operations discussed. Additionally, the order in which the operations of methods 2000, 3000, 4000 are illustrated in FIGS. 2-4 and described below is not intended to be limiting.

FIG. 2 illustrates method 2000, in accordance with one or more embodiments.

An operation 2010 may include discovering one or more virtual machines (e.g., VMs 1030a-n) associated with a first auto scaling group (e.g., auto scaling group 1040). The one or more virtual machines may be running on a first cloud (e.g., source cloud 1010). The first auto scaling group may have settings (e.g., settings 1050) related to running the one or more virtual machines. Operation 2010 may be performed by the recommendation engine 1060, in accordance with one or more embodiments.

An operation 2010 may include generating a plan (e.g., the plan 1070) to backup the one or more virtual machines to a second cloud (e.g., the target cloud 1020). Operation 2010 may be performed by the recommendation engine 1060, in accordance with one or more embodiments.

FIG. 3 illustrates method 3000, in accordance with one or more embodiments.

An operation 3010 may include executing the plan (e.g., the plan 1070). Executing the plan may include backing up the proper subset (e.g., proper subset 1080) of the one or more virtual machines (e.g., VMs 1030a-n) to the second cloud (e.g., target cloud 1020) in accordance with one or more techniques described above for FIG. 1.

FIG. 4 illustrates method 4000, in accordance with one or more embodiments.

An operation 4010 may include presenting the plan (e.g., the plan 1070) to a user or application before executing the plan. An operation 4020 may include the user or application deciding whether to execute the plan without changes. If the user or application decides to execute the plan without changes, then an operation 4040 may include executing the plan, in accordance with one or more techniques described above for FIG. 1. Otherwise, an operation 4030 may include modifying the plan as described above for FIG. 1. In this case, operation 4040 may include executing the modified plan, in accordance with one or more techniques described above for FIG. 1.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 5:
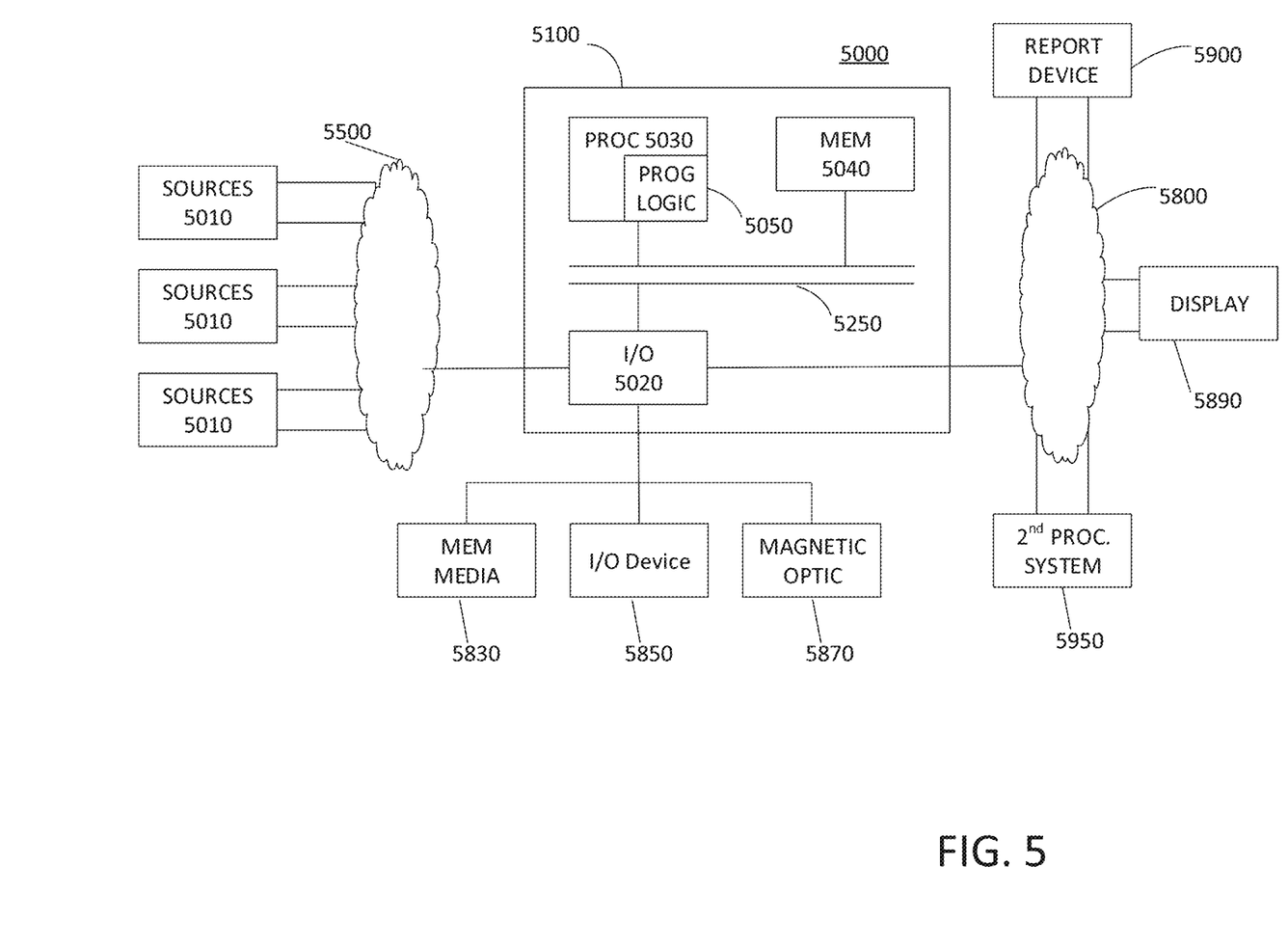
FIG. 5 is an example of an embodiment of an apparatus that may utilize the techniques described herein, in accordance with an embodiment of the present disclosure.

FIG. 5 is a block diagram illustrating an apparatus, such as a computer 5100 in a network 5000, which may utilize the techniques described herein according to an example embodiment of the present invention. The computer 5100 may include one or more I/O ports 5020, a processor 5030, and memory 5040, all of which may be connected by an interconnect 5250, such as a bus. Processor 5030 may include program logic 5050. The I/O port 5020 may provide connectivity to memory media 5830, I/O devices 5850, and drives 5870, such as magnetic drives, optical drives, or Solid State Drives (SSD). FIG. 5 also illustrates sources 5010, interconnects 5550 and 5880 (for example, a bus, an ethernet connection, a local area network, a wide area network, the Internet, and the like), $2^{nd}$ proc. system 5950, display 5890, and report device 5900. When the program logic 5050 is loaded into memory 5040 and executed by the computer 5100, the machine becomes an apparatus for practicing the invention. When implemented on one or more general-purpose processors 5030, the program code combines with such a processor to provide a unique apparatus that operates analogously to specific logic circuits. As such, a general purpose digital machine can be transformed into a special purpose digital machine.

Figure 6:
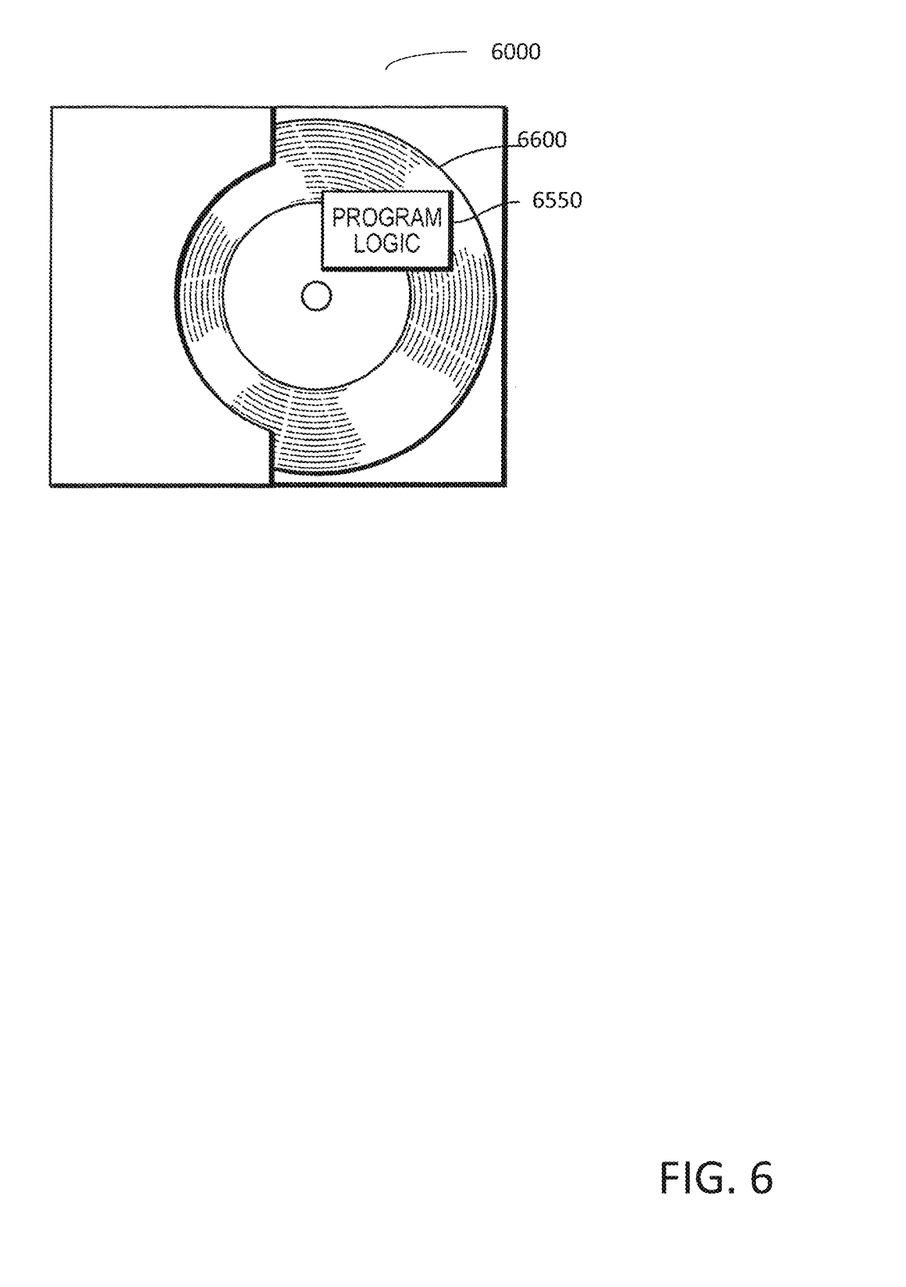
FIG. 6 is an example of a method embodied on a computer readable storage medium that may utilize the techniques described herein, in accordance with an embodiment of the present disclosure.

FIG. 6 is a block diagram illustrating a method embodied on a computer readable storage medium 6600 that may utilize the techniques described herein according to an example embodiment of the present invention. FIG. 6 shows Program Logic 6550 embodied on a computer-readable medium 6600 as shown, and wherein the Logic is encoded in computer-executable code configured for carrying out the methods of this invention and thereby forming a Computer Program Product 6000. Program Logic 6550 may be the same logic 5050 on memory 5040 loaded on processor 5030 in FIG. 4. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-4. For purposes of illustrating the present invention, the invention is described as embodied in a specific configuration and using special logical arrangements, but one skilled in the art will appreciate that the device is not limited to the specific configuration but rather only by the claims included with this specification.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present disclosure may take the form of a computer program product on a computer-usable storage medium having computer-usable program code embodied in the medium.

The flowchart and block diagrams in the Figures illustrate the architecture, functionality, and operation of possible embodiments of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
    discovering a plurality of virtual machines associated with a first auto scaling group, wherein the plurality of virtual machines is running on a first cloud, wherein the first auto scaling group has settings related to running the plurality of virtual machines; and
    generating a plan to backup the first auto scaling group to a second cloud, wherein the plan avoids launching a respective virtual machine on the second cloud for each of the plurality of virtual machines associated with the first auto scaling group by:
        choosing a proper subset of the plurality of virtual machines to backup, the proper subset being logically equivalent to the plurality of virtual machines associated with the first auto scaling group;
        creating one or more restore virtual machine images based on the proper subset of the plurality of virtual machines to backup;
        initializing a second auto scaling group on the second cloud based on the settings and the one or more restore virtual machine images;

executing the plan by backing up the proper subset of the plurality of virtual machines to the second cloud; and launching, by the second auto scaling group, a set of virtual machines on the second cloud based on the settings and the one or more restore virtual machine images to complete the plan to backup the first auto scaling group to a second cloud, wherein the set of virtual machines on the second cloud is the backup of the first auto scaling group.

2. The method of claim 1, wherein the proper subset of the plurality of virtual machines to backup is a single virtual machine.

3. The method of claim 1, wherein the one or more restore virtual machine images is a single restore virtual machine image.

4. The method of claim 1, wherein the creating the one or more restore virtual machine images is performed by a restore virtual machine on the second cloud.

5. The method of claim 1, wherein launching, by the second auto scaling group, the set of virtual machines on the second cloud based on the settings and the one or more restore virtual machine images comprises:

launching the proper subset of the plurality of virtual machines that were backed up to the second cloud; and using the settings to launch additional virtual machines based on the proper subset.

6. A system comprising:

one or more processors; and computer-executable program logic operating in memory, wherein the computer executable program logic enables execution across the one or more processors of:

discovering a plurality of virtual machines associated with a first auto scaling group, wherein the plurality of virtual machines is running on a first cloud, wherein the first auto scaling group has settings related to running the plurality of virtual machines; and generating a plan to backup the plurality of virtual machines to a second cloud, wherein the plan avoids launching a respective virtual machine on the second cloud for each of the plurality of virtual machines associated with the first auto scaling group by:

choosing a proper subset of the plurality of virtual machines to backup, the proper subset being logically equivalent to the plurality of virtual machines associated with the first auto scaling group;

creating one or more restore virtual machine images based on the proper subset of the plurality of virtual machines to backup;

initializing a second auto scaling group on the second cloud based on the settings and the one or more restore virtual machine images;

executing the plan by backing up the proper subset of the plurality of virtual machines to the second cloud; and launching, by the second auto scaling group, a set of virtual machines on the second cloud based on the settings and the one or more restore virtual machine images to complete the plan to backup the first auto scaling group to a second cloud, wherein the set of virtual machines on the second cloud is the backup of the first auto scaling group.

7. The system of claim 6, wherein the proper subset of the plurality of virtual machines to backup is a single virtual machine.

8. The system of claim 6, wherein the one or more restore virtual machine images is a single restore virtual machine image.

9. The system of claim 6, wherein the creating the one or more restore virtual machine images is performed by a restore virtual machine on the second cloud.

10. The system of claim 6, wherein launching, by the second auto scaling group, the set of virtual machines on the second cloud based on the settings and the one or more restore virtual machine images comprises:

launching the proper subset of the plurality of virtual machines that were backed up to the second cloud; and using the settings to launch additional virtual machines based on the proper subset.

11. A computer program product comprising:

a non-transitory computer readable medium encoded with computer executable program code, the code enabling execution across one or more processors of:

discovering a plurality of virtual machines associated with a first auto scaling group, wherein the plurality of virtual machines is running on a first cloud, wherein the first auto scaling group has settings related to running the plurality of virtual machines; and generating a plan to backup the plurality of virtual machines to a second cloud wherein the plan avoids launching a respective virtual machine on the second cloud for each of the plurality of virtual machines associated with the first auto scaling group by: choosing a proper subset of the plurality of virtual machines to backup, the proper subset being logically equivalent to the plurality of virtual machines associated with the first auto scaling group;

creating one or more restore virtual machine images based on the proper subset of the plurality of virtual machines to backup;

initializing a second auto scaling group on the second cloud based on the settings and the one or more restore virtual machine images;

executing the plan by backing up the proper subset of the plurality of virtual machines to the second cloud; and launching, by the second auto scaling group, a set of virtual machines on the second cloud based on the settings and the one or more restore virtual machine images to complete the plan to backup the first auto scaling group to a second cloud, wherein the set of virtual machines on the second cloud is the backup of the first auto scaling group.

12. The computer program product of claim 11, wherein the proper subset of the plurality of virtual machines to backup is a single virtual machine.

13. The computer program product of claim 11, wherein the one or more restore virtual machine images is a single restore virtual machine image.

14. The computer program product of claim 11, wherein the creating the one or more restore virtual machine images is performed by a restore virtual machine on the second cloud.

15. The computer program product of claim 11, wherein launching, by the second auto scaling group, the set of virtual machines on the second cloud based on the settings and the one or more restore virtual machine images comprises:

launching the proper subset of the plurality of virtual machines that were backed up to the second cloud; and using the settings to launch additional virtual machines based on the proper subset.

* * * * *